United States Patent
Greendale

[19]

[11] Patent Number: 5,978,736
[45] Date of Patent: Nov. 2, 1999

[54] VEHICLE OBSTRUCTION DETECTION SYSTEM

[75] Inventor: Steven Greendale, Newport Pagnell, United Kingdom

[73] Assignee: GEC-Marconi Avionics (Holdings) Ltd., United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,330

[22] Filed: Mar. 11, 1997

Related U.S. Application Data

[63] Continuation of application No. 08/428,210, Jun. 8, 1995, abandoned.

[30] Foreign Application Priority Data

Nov. 20, 1992 [GB] United Kingdom ................... 9224366

[51] Int. Cl.$^6$ ...................................................... G08G 1/00
[52] U.S. Cl. ......................... 701/300; 701/301; 340/904
[58] Field of Search .................................. 364/460, 461, 364/426.041, 423.098; 340/901, 902, 903, 904, 435, 436, 554, 555, 556, 557; 180/167–170, 176–179; 701/1, 93, 300, 301

[56] References Cited

U.S. PATENT DOCUMENTS

| | | | |
|---|---|---|---|
| 4,528,563 | 7/1985 | Takeuchi | 340/904 |
| 4,551,722 | 11/1985 | Tsuda et al. | 340/901 |
| 4,561,064 | 12/1985 | Brüggen et al. | 364/461 |
| 4,910,512 | 3/1990 | Riedel | 340/904 |
| 5,110,203 | 5/1992 | MacCabee | 356/5 |
| 5,212,467 | 5/1993 | Park | 340/903 |
| 5,314,037 | 5/1994 | Shaw et al. | 340/903 |
| 5,388,048 | 2/1995 | Yavnayi et al. | 340/903 |

FOREIGN PATENT DOCUMENTS

| | | |
|---|---|---|
| 1 291 474 | 10/1972 | United Kingdom . |
| 1 383 933 | 2/1975 | United Kingdom . |
| 1 509 138 | 4/1978 | United Kingdom . |
| 2 000 411 | 1/1979 | United Kingdom . |
| 1 546 061 | 5/1979 | United Kingdom . |
| 1 565 873 | 4/1980 | United Kingdom . |
| 1 598 860 | 9/1981 | United Kingdom . |

*Primary Examiner*—Gary Chin
*Attorney, Agent, or Firm*—Kirschstein et al.

[57] ABSTRACT

A vehicle obstruction avoidance system particularly for reversing a vehicle towards obstructions not visible in the wing mirrors. A radar head is mounted on the rear bumper, the head including a scanner and sensor. The total range of interest is only a few meters and provides very little time for processing echoes from all range cells in the range. The invention provides a system in which only one range cell is processed with each pulse transmission and the range cell is stepped on for the next pulse.

4 Claims, 1 Drawing Sheet

VEHICLE OBSTRUCTION DETECTION SYSTEM

CROSS REFERENCE TO RELATED APPLICATION

This application is a continuation of U.S. patent application Ser. No. 08/428,210, filed Jun. 8, 1995, now abandoned.

BACKGROUND OF THE INVENTION

This invention relates to vehicle obstruction detection systems and particularly, but not exclusively, to such detection systems for use on vehicles in car parks and other areas of restricted space and random 'obstructions'.

When reversing a vehicle into a confined space or up to a stationary object such as another vehicle, wall, lamp-post etc, it is frequently difficult, from the position of the driver's seat, to estimate the clearance distance between the rear of the vehicle and adjacent objects. Such objects may be damaged by, or be a hazard to, the vehicle.

Radar systems for detecting the presence and range of objects are of course well known. Similarly, light based systems using lasers for the same purpose—"lidar"—are known. In such systems the range is commonly determined by means of a series of "range gates" which open for a predetermined short time commencing at some predetermined time after the transmission of the radar pulse. The delay between transmit pulse and gate opening is staggered so that the range gates cover successive periods in the range of interest, and thus cover the actual range of interest. A complete picture in the direction of transmission can thus be obtained from the various returns of a single pulse from different range cells. Such a system may be satisfactory in most radar situations, eg. where the target is a tank, aircraft or other military entity at some distance, but presents difficulty when the circumstances are of a much more localised or domestic nature and particularly when the 'target' range is only several meters at maximum and more commonly only tens of centimeters.

In such circumstances the pulse transit time is likely to be of the order of a nanosecond or less and each range cell perhaps 15 centimeters. Processing circuitry which could cope with successive signal samples at intervals of a nanosecond would at best be very expensive and at worst be impracticable. Anologue-digital converters in particular are generally not able to operate at this speed.

In another context it is known to use radar to determine the height of clouds, to assist in the landing and take-off of aircraft for example. A similar principle is involved in that radar pulses are transmitted vertically upward and range gates are timed to receive signals from successive range cells. In this case however, the maximum range could be in the region of 3000 meters with range cells of perhaps 20 meters. The assessment of a single range cell per pulse (or per multiplicity of pulses) has been proposed but there is clearly no pressure on the speed of the processing electronics in view of the great distances and substantial transit times involved.

SUMMARY OF THE INVENTION

The present invention is in a clearly very different context of very small distances associated with the slow movement of road vehicles. As a reference, the maximum range of interest may be taken as not substantially exceeding the maximum dimension of the vehicle on which the system is, or is to be, fitted. Commonly, this range of interest will be a small fraction of the vehicle dimension, for example one meter. The range cells need to be correspondingly small, typically 10 to 15 centimeters.

An object of the present invention is then to facilitate the determination of the range of obstructions in road vehicle situations such as described above.

According to one aspect of the invention, a vehicle obstruction detection system for detecting obstructions within the immediate vicinity of a vehicle and within a range which is a fraction of the maximum vehicle dimension, comprises a radiation source for producing a train of non-visible electromagnetic wave pulses, an echo receiver for detecting reflections of the pulses from an obstruction within a predetermined field, the receiver including means for limiting the response to each pulse to a particular range interval within the range and means for selecting sequential values of the range interval for different pulses or groups of pulses.

The means for limiting the response to a particular range interval preferably comprises range gate means defining a particular range interval, processing means for processing signals accepted by the range gate means, and means for stepping the range gate means through the range intervals sequentially. The means for stepping the range gate means may be arranged to be stepped once for each pulse transmitted.

According to another aspect of the invention, a method of detecting and locating obstructions to the manoeuvring of a vehicle when the obstructions are within a range of interest which is a fraction of the maximum vehicle dimension, comprises the steps of transmitting a train of electromagnetic pulses each of duration corresponding to the required range interval within said range of interest, operating a receiver gate for a time interval corresponding to a single range interval in respect of each pulse, and stepping the time interval sequentially so that the range of interest is covered by a plurality of pulses.

BRIEF DESCRIPTION OF THE DRAWINGS

A vehicle obstruction detection system in accordance with the invention will now be described, by way of example, with reference to the accompanying drawings, of which.

DETAILED DESCRIPTION OF THE PREFERRED EMBODIMENTS

Figure 2:
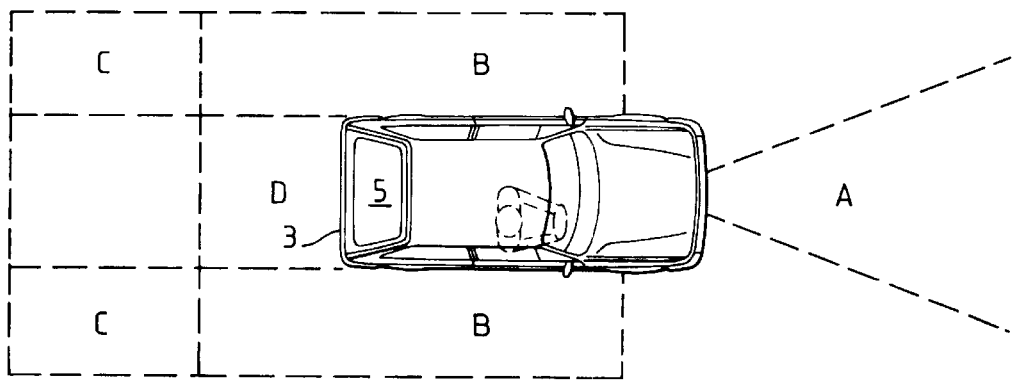
FIG. 2 is a diagrammatic plan view of a car with the obstruction area relevant to the invention indicated as one of a number of areas of significance in navigation of the vehicle.

Referring to the drawings, and in particular to FIG. 2, the region around the car is divided into different sections A, B, C and D for various purposes associated with its navigation.

Section A in front of the car is a sector extending for a considerable distance and covering the car's own lane and adjacent lanes in addition, for the detection and discrimination of vehicles and non-offensive road furniture, as described in GB-Patent Application No: 9313724.

Sections B cover the areas on each side and partly to the rear of the car. Sections C are the areas commonly known as 'blind spots' in which adjacent cars can not normally be seen in the wing mirrors of the car in question. Section D immediately to the rear of the car is of particular concern to the present invention. It extends the width of the car and rearwards for about 2–3 meters. It is in this region D that objects, obstructions, vehicles etc will cause a potential hazard when the car is reversing.

Figure 1:
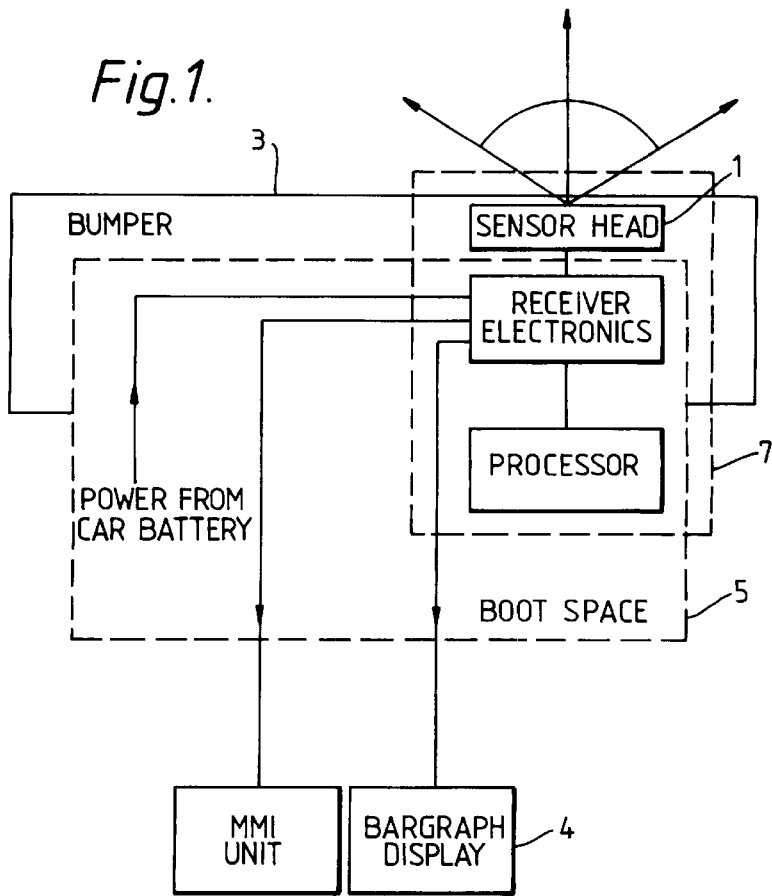
FIG. 1 is a block diagram of the basic elements of the system as applied to a car.

The car is consequently fitted with an obstruction detection system as illustrated in FIG. 1. A sensor head 1 is mounted on or immediately adjacent the rear bumper 3 of the car, the sensor being directed rearwards. The sensor head is a short-range scanning laser and optical sensor and in particular comprises a solid state laser or light emitting diode (not shown) driven by a modulator supplying it with very short pulses of 1 or 2 nanoseconds duration, and at a pulse repetition rate of the order of 5 kHz. The sensor head includes a rotating or oscillating plane mirror arranged to scan the laser beam over the azimuth angle of interest. In the case of the rotating mirror, pulse transmission is linked with the mirror orientation so as to transmit only within the arc of interest. The mirror orientation is determined by angle pick-off means, eg. optically coded rotor discs, and provided to the display 4 to identify the current laser beam position.

The laser and scanner are part of a receiver which includes:

(a) a wavelength filter which predominantly passes the wavelength emitted by the laser or light emitting diode e.g. between 0.8 and 2.0 microns, in preference to other, visible, wavelengths, arising for example from sunlight, car or street lights etc., (b) focussing optics for concentrating the relatively weak echo pulses returned by detected objects onto a photodetector.

(c) the photodetector which converts the weak echo pulses into weak electrical pulses in known manner, (d) an electronic amplifier with gain rapidly variable between low and high, and (e) an output interface for driving the display The receiver electronics, that is, other than the laser/sensor head, are conveniently housed integrally with the sensor head or adjacent to it.

Because the intensity of the echo signal returned by a detected object is strongly dependent on the range of the object, many conventional radar systems employ a method whereby, following the transmission of each pulse, the gain of the receiver amplifier is varied from low to high in the time it takes for echoes to be returned from the shortest to the longest range required to be processed and/or displayed. Such systems are known as "sensitivity-time control" or "swept gain" systems.

In the present application, because of the short ranges involved, incurring time delays of only a few nanoseconds even from objects at maximum range, the implementation of swept gain in a system in which all range gates respond to a single transmitted pulse would require excessively sophisticated and expensive electronic circuitry. Instead, a simpler system is employed although this incurs the (acceptable) penalty of a lower data rate. In this simpler system of rendering the signals to be processed virtually independent of the range of the object detected, only one range interval at a time is "processed" or "inspected for the presence of an echo" following the transmission of each pulse. After each pulse the range interval to be processed is incremented by an amount equal to that interval and the process repeated with another transmitted pulse. At the same time the gain is stepped in correspondence with the greater range.

In order to acquire a greater signal level at each range increment, a multiplicity of pulses may be transmitted before incrementing the range to the next range cell.

The display 4 may be positioned in front of the driver with the other instruments, or possibly behind or to one side of him so that he would be able to see it when facing rearwards in a reversing situation. In such a situation he would switch on the system so as to scan the region D of FIG. 2 and see a display of the region D from the bumper outwards. From the position of the laser head on the bumper, a PPI radial display would show an arc of 160°–170° in azimuth and any obstructions within that arc, which would include anything within a few centimeters of the "bumper". It is the visual location of the obstruction relative to the bumper that is important, rather than a quantitative measure of the range to bumper.

Thus, a laser or light-emitting-diode based system provides the driver of a vehicle with information on the relative position of any obstruction, (larger than a specified size and within a specified range and limits of lateral position), to the rear of his vehicle.

I claim:

1. A road vehicle reversing aid for detecting obstructions located behind and within the immediate vicinity of a reversing road vehicle, the obstructions being located within a range being a fraction of the maximum vehicle dimension, the system comprising: a radiation source on the vehicle for transmitting non-visible electromagnetic wave pulse transmissions to one of the obstructions within the range for reflection from the one obstruction; and an echo receiver on the vehicle for detecting reflections of the pulse transmissions from the one obstruction within the range and for generating a response indicative of the presence of the one obstruction upon detection of the reflections of the pulse transmissions, the echo receiver including means for processing and for limiting the response to each pulse transmission to a particular single range interval within said range, only one range interval being processed for each pulse transmission, and means for selecting sequentially a different one of the range intervals for each of the subsequent pulse transmissions.

2. The reversing aid according to claim 1, wherein said means for limiting the response to the particular range interval comprises range gate means defining the particular range interval, processing means for processing signals accepted by said range gate means, and means for stepping said range gate means through the range intervals sequentially.

3. The reversing aid according to claim 2, wherein said means for stepping said range gate means is stepped once for each pulse transmitted by the radiation source.

4. A method of detecting and locating obstructions located behind and within the immediate vicinity of a reversing road vehicle when the obstructions are located within a range of interest which is a fraction of the maximum vehicle dimension, the method comprising the steps of: transmitting electromagnetic pulse transmissions to one of the obstructions within the range for reflection from the one obstruction, each pulse transmission corresponding to a single range interval within said range of interest; operating an echo receiver to detect reflections of the pulse transmissions from the one obstruction within the range, and to detect a response indicative of the presence of the one obstruction upon detection of the reflections of the pulse transmissions; operating a receiver range gate for a single range interval within said range in respect of each pulse transmission whereby only one range interval being processed for each pulse transmission; and selecting sequentially a different one of the range intervals for each of the subsequent pulse transmissions.

* * * * *